United States Patent
Vaidyanathan et al.

(10) Patent No.: US 6,899,777 B2
(45) Date of Patent: *May 31, 2005

(54) CONTINUOUS FIBER REINFORCED COMPOSITES AND METHODS, APPARATUSES, AND COMPOSITIONS FOR MAKING THE SAME

(75) Inventors: K. Ranji Vaidyanathan, Tucson, AZ (US); Joseph Walish, Tucson, AZ (US); Mark Fox, Tucson, AZ (US); John W. Gillespie, Jr., Hockessin, DE (US); Shridhar Yarlagadda, Newark, DE (US); Michael R. Effinger, Fayetteville, TN (US); Anthony C. Mulligan, Tucson, AZ (US); Mark J. Rigali, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 96 days.

This patent is subject to a terminal disclaimer.

(21) Appl. No.: 10/038,957

(22) Filed: Jan. 2, 2002

(65) Prior Publication Data

US 2003/0044593 A1 Mar. 6, 2003

Related U.S. Application Data

(60) Provisional application No. 60/259,284, filed on Jan. 2, 2001.

(51) Int. Cl.⁷ .............................. B32B 31/26; B22F 7/02; G06F 17/50
(52) U.S. Cl. ................................ 156/89.11; 156/89.23; 156/89.26; 156/89.27; 156/167; 156/180; 264/640; 264/642; 419/5; 419/24; 700/98
(58) Field of Search .................... 419/5, 24; 156/89.11, 156/89.23, 89.25, 89.26, 89.27, 89.28, 166–181; 700/98; 264/640, 641, 642

(56) References Cited

U.S. PATENT DOCUMENTS

| | | | |
|---|---|---|---|
| 5,024,978 A | | 6/1991 | Allaire et al. |
| 5,121,329 A | * | 6/1992 | Crump ........................ 700/119 |
| 5,154,787 A | * | 10/1992 | Gardner et al. ............. 156/166 |
| 5,221,563 A | * | 6/1993 | Haller et al. ................. 427/558 |
| 5,250,243 A | | 10/1993 | Allaire et al. |
| 5,562,966 A | * | 10/1996 | Clarke et al. ................ 428/113 |
| 5,639,337 A | * | 6/1997 | Darrieux et al. ............ 156/430 |
| 5,936,861 A | | 8/1999 | Jang et al. |
| 6,144,008 A | * | 11/2000 | Rabinovich ............ 219/121.64 |
| 6,251,340 B1 | * | 6/2001 | Tseng ........................... 419/36 |

(Continued)

OTHER PUBLICATIONS

M. K. Aghajanian, M. A. Rocazella, J. T. Burke, and S. D. Keck, "The Fabrication of Metal Matrix Composites by a Pressureless Infiltration Technique," *J. Mater. Sci.*, 26 447–54 (1991).

(Continued)

*Primary Examiner*—Melvin C. Mayes
(74) *Attorney, Agent, or Firm*—Banner & Witcoff, Ltd.

(57) ABSTRACT

A process for continuous composite coextrusion comprising: (a) forming first a material-laden composition comprising a thermoplastic polymer and at least about 40 volume % of a ceramic or metallic particulate in a manner such that the composition has a substantially cylindrical geometry and thus can be used as a substantially cylindrical feed rod; (b) forming a hole down the symmetrical axis of the feed rod; (c) inserting the start of a continuous spool of ceramic fiber, metal fiber or carbon fiber through the hole in the feed rod; (d) extruding the feed rod and spool simultaneously to form a continuous filament consisting of a green matrix material completely surrounding a dense fiber reinforcement and said filament having an average diameter that is less than the average diameter of the feed rod; and (e) depositing the continuous filament into a desired architecture which preferably is determined from specific loading conditions of the desired object and CAD design of the object to provide a green fiber reinforced composite object.

13 Claims, 3 Drawing Sheets

U.S. PATENT DOCUMENTS

| | | | | |
|---|---|---|---|---|
| 6,355,338 | B1 | * | 3/2002 | Hilmas et al. ............ 428/297.1 |
| 6,797,220 | B2 | * | 9/2004 | Mulligan et al. ............ 264/241 |
| 2002/0130434 | A1 | * | 9/2002 | Rigali et al. ............ 264/171.13 |
| 2002/0142148 | A1 | * | 10/2002 | Hillmas et al. ........... 428/297.1 |
| 2002/0165304 | A1 | * | 11/2002 | Mulligan et al. ............ 524/404 |

OTHER PUBLICATIONS

J. J. Brennan and K. M. Prewo, "Silicon Carbide Fiber Reinforced Glass–Ceramic Matrix Composites Exhibiting High Strength Toughness," *J. Mater. Sci.*, 17 2371–83 (1982).

M. K. Brun, W. B. Hillig, and H. C. McGuigan, "High Temperature Mechanical Properties of a Continuous Fiber-Reinforced Composite Made by Melt Infiltration," *Ceram. Eng. Sci. Proc.*, 10 [7–8] 611–21 (1989).

A. J. Caputo and W. J. Lackey, "Fabrication of Fiber–Reinforced Ceramic Composites by Chemical Vapor Infiltration," *Ceram. Eng. Sci. Proc.*, 5 [7–8] 654–67 (1984).

A. J. Caputo, W. J. Lackey, and D. P. Stinton, "Development of a New, Faster, Process for the Fabrication of Ceramic Fiber–Reinforced Ceramic Composites by Chemical Vapor Infilteration," *Ceram. Eng. Sci. Proc.*, 6 [7–8] 694–706 (1985).

D. R. Dryell and C. W. Freeman, "Trends in Design in Turbines for Aero Engines," pp. 38–45 in *Materials Development in Turbo–Machinery Design; 2nd Parsons International Turbine Conference*, Edited by D. M. R. Taplin, J. F. Knott, and M. H. Lewis, The Institute of Metals, Parsons Press, Trinity College, Dublin, Ireland, 1989.

E. Fitzer and R. Gadow, "Fiber Reinforced Composites Via the Sol–Gel Route", pp. 571–608 in Tailoring Multiphase and Composite Ceramics, Materials Science Research Symposium Proceedings, vol. 20, edited by R. E. Tressler et al., Pienum Press, New York, 1986.

*Flight Vehicle Materials, Structures and Dynamics—Assessment and Future Directions,* vol. 3, edited by S. R. Levine, American Society of Mechanical Engineers, New York, 1992.

J. Jamet, J. R. Spann, R. W. Rice, D. Lewis, and W. S. Coblenz, "Ceramic–Fiber Composite Processing via Polymer–Filler Matrices," *Ceram. Eng. Sci. Proc.*, 5 [7–8] 677–94 (1984).

M. A. Karnitz, D. F. Craig, and S. L. Richlin, "Continuous Fiber Ceramic Composite Program," *Am. Ceram. Soc. Bull.*, 70 [3] 430–35 (1991).

H. Kodama, H. Sakamoto, and Y. Miyoshi, "Silicon Carbide Monofilament–Reinforced Silicon Nitride or Silicon Carbide Matrix Composites," *J. Am. Ceram. Soc.*, 72 [4] 551–58 (1989).

P. Lamicq, G. A. Gernhart, M. M. Danchier, and J. G. Mace, "SiC/SiC Composite Ceramics," *Am. Ceram. Soc. Bull.*, 65 [2] 336–38 (1986).

J. J. Lannutti and D. E. Clark, "Long Fiber Reinforced Sol–Gel Derived $Al_2O_3$ Composites", pp. 375–381 in *Better Ceramics Through Chemistry, Material Research Society Symposium Proceedings*, vol. 32, North–Holland, New York, 1984.

T. I. Mah, M. G. Mendiratta, A. P. Katz, and K. S. Mazdlyasni, "Recent Developments in Fiber–Reinforced High Temperature Ceramic Composites," *Am. Ceram. Soc. Bull.*, 66 [2] 304–08 (1987).

R. L. Mehan, W. B. Hillig, and C. R. Morelock, "Si/SiC Ceramic Composites: Properties and Applications," *Ceram. Eng. Sci. Proc.*, 1 405 (1980).

M. S. Newkirk, A. W. Urquhart, H. R. Zwicker, and E. Breval, "Formation of Lanxide Ceramic Composite Materials," *J. Mater. Res.*, 1 81–89 (1986).

D. C. Phillips, "Fiber Reinforced Ceramics," Chapter 7 in *Fabrication of Composites*, edited by A. Kelly and S. T. Mileiko, North–Holland Publishing Company, Amsterdam, The Netherlands, 1983.

K. M. Prewo and J. J. Brennan, "High Strength Silicon Carbide Fibre Reinforced Glass–Matrix Composites," *J. Mater. Sci.*, 15 463–68 (1980).

K. M. Prewo and J. J. Brennan, "Silicon Carbide Yam Reiforced Glass Matrix Composites," *J. Mater. Sci.*, 17 1201–06 (1982).

K. M. Prewo, "Fiber–Reinforced Ceramics: New Opportunities for Composite Materials," *Am. Ceram. Soc. Bull.*, 68 [2] 395–400 (1989).

K. Sato, T. Suzuki, O. Funayama, T. Isoda, "Preparation of Carbon Fiber Reinforced Composite by Impregnation with Perhydropolysilazane Followed by Pressureless Firing," *Ceram. Eng. Sci. Proc.*, 13 [9–10] 614–21 (1992).

J. R. Strife, J. J. Brennan, and K. M. Prewo, "Status of Continuous Fiber–Reinforced Ceramic Matrix Composite Processing Technology," *Ceram. Eng. Sci. Proc.*, 11 [7–8] 871–919 (1990).

L. R. White, T. L. Tompkins, K. C. Hsieh, and D. D. Johnson, "Ceramic Filters for Hot Gas Cleanup," *J. Eng. for Gas Turbines and Power*, vol. 115, 665–69 (1993).

* cited by examiner

CONTINUOUS FIBER REINFORCED COMPOSITES AND METHODS, APPARATUSES, AND COMPOSITIONS FOR MAKING THE SAME

CROSS REFERENCE TO RELATED APPLICATION

This application is based on, and claims the benefit of, co-pending U.S. Provisional Application Ser. No. 60/259,284, filed on Jan. 2, 2001, and entitled "Automated Tow Placement Process for Fabricating Fiber Reinforced Ceramic Matrix Composites".

This invention was made with U.S. Government support under SBIR grant Numbers NAS8-000192, NAS8-00084, and NAS8-01016, awarded by the National Aeronautics and Space Administration. The Government has certain rights in the invention described and claimed herein.

TECHNICAL FIELD OF THE INVENTION

The present invention relates to continuous composite coextrusion methods, apparatuses for coextrusion, and compositions for preparing composites, such as continuous fiber reinforced ceramic matrix composites, using dense fibers and green matrices as well as to methods and apparatuses for the preparation of composites having interfaces between dense fibers and green matrices, particularly three-dimensional objects having complex geometries.

BACKGROUND OF THE INVENTION

Composites are combinations of two or more materials present as separate phases and combined to form desired structures so as to take advantage of certain desirable properties of each component. The materials can be organic, inorganic, or metallic, and in various forms, including but not limited to particles, rods, fibers, plates and foams. Thus, a composite, as defined herein, although made up of other materials, can be considered to be a new material have characteristic properties that are derived from its constituents, from its processing, and from its microstructure.

Composites are made up of the continuous matrix phase in which are embedded: (1) a three-dimensional distribution of randomly oriented reinforcing elements, e.g., a particulate-filled composite; (2) a two-dimensional distribution of randomly oriented elements, e.g., a chopped fiber mat; (3) an ordered two-dimensional structure of high symmetry in the plane of the structure, e.g., an impregnated cloth structure; or (4) a highly-aligned array of parallel fibers randomly distributed normal to the fiber directions, e.g., a filament-wound structure, or a prepreg sheet consisting of parallel rows of fibers impregnated with a matrix.

Monolithic ceramic materials are known to exhibit certain desirable properties, including high strength and high stiffness at elevated temperatures, resistance to chemical and environmental attack, and low density. However, monolithic ceramics have one property that limits their use in stressed environments, namely their low fracture toughness. While significant advances have been made to improve the fracture toughness of monolithic ceramics, mostly through the additions of whisker and particulate reinforcements or through careful control of the microstructural morphology, they still remain extremely damage intolerant. More specifically, they are susceptible to thermal shock and will fail catastrophically when placed in severe stress applications. Even a small processing flaw or crack that develops in a stressed ceramic cannot redistribute or shed its load on a local scale. Under high stress or even mild fatigue, the crack will propagate rapidly resulting in catastrophic failure of the part in which it resides. It is this inherently brittle characteristic which can be even more pronounced at elevated temperatures, that has not allowed monolithic ceramics to be utilized in any safety-critical designs.

Research and development for these high temperature and high stress applications have focused on the development of continuous fiber reinforced ceramic matrix composites, hereafter referred to as CFCCs. The use of fiber reinforcements in the processing of ceramic and metal matrix composites is known in the prior art, and has essentially provided the fracture toughness necessary for ceramic materials to be developed for high stress, high temperature applications. See J. J. Brennan and K. M. Prewo, "High Strength Silicon Carbide Fiber Reinforced Glass-Matrix Composites," *J. Mater. Sci.*, 15 463–68 (1980); J. J. Brennan and K. M. Prewo, "Silicon Carbide Fiber Reinforced Glass-Ceramic Matrix Composites Exhibiting High Strength Toughness," *J. Mater. Sci.*, 17 2371–83 (1982); P. Lamicq, G. A. Gernhart, M. M. Danchier, and J. G. Mace, "SiC/SiC Composite Ceramics," *Am. Ceram. Soc. Bull.*, 65 [2] 336–38 (1986); T. I. Mah, M. G. Mendiratta, A. P. Katz, and K. S. Mazdiyasni, "Recent Developments in Fiber-Reinforced High Temperature Ceramic Composites," *Am. Ceram. Soc. Bull.*, 66 [2] 304–08 (1987).; K. M. Prewo, "Fiber-Reinforced Ceramics: New Opportunities for Composite Materials," *Am. Ceram. Soc. Bull.*, 68 [2] 395–400 (1989); H. Kodama, H. Sakamoto, and T. Miyoshi, "Silicon Carbide Monofilament-Reinforced Silicon Nitride or Silicon Carbide Matrix Composites," *J Am. Ceram. Soc.*, 72 [4] 551–58 (1989); and J. R. Strife, J. J. Brennan, and K. M. Prewo, "Status of Continuous Fiber-Reinforced Ceramic Matrix Composite Processing Technology," *Ceram. Eng. Sci. Proc.*, 11 [7–8] 871–919 (1990).

Under high stress conditions, the fibers are strong enough to bridge the cracks which form in the ceramic matrix allowing the fibers to ultimately carry the load, and catastrophic failure can be avoided. This type of behavior has led to a resurgence of CFCCs as potential materials for gas turbine components, such as combustors, first-stage vanes, and exhaust flaps. See D. R. Dryell and C. W. Freeman, "Trends in Design in Turbines for Aero Engines," pp. 38–45 in *Materials Development in Turbo-Machinery Design*; 2nd *Parsons International Turbine Conference*, Edited by D. M. R. Taplin, J. F. Knott, and M. H. Lewis, The Institute of Metals, Parsons Press, Trinity College, Dublin, Ireland, 1989. CFCCs have also been given serious consideration for heat exchangers, rocket nozzles, and the leading edges of next-generation aircraft and reentry vehicles. See M. A. Kamitz, D. F. Craig, and S. L. Richlin, "Continuous Fiber Ceramic Composite Program," *Am. Ceram. Soc. Bull.*, 70 [3] 430–35 (1991), and *Flight Vehicle Materials, Structures and Dynamics—Assessment and Future Directions*, Vol. 3, edited by S. R. Levine, American Society of Mechanical Engineers, New York, 1992. In addition, CFCCs with a high level of open porosity are currently being utilized as filters for hot-gas cleanup in electrical power generation systems, metal refining, chemical processing, and diesel exhaust applications. See L. R. White, T. L. Tompkins, K. C. Hsieh, and D. D. Johnson, "Ceramic Filters for Hot Gas Cleanup," *J. Eng. for Gas Turbines and Power*, Vol. 115, 665–69 (1993).

CFCCs are currently fabricated by a number of techniques. The simplest and most common method for their fabricating has been the slurry infiltration technique whereby a fiber or fiber tow is passed through a slurry containing the matrix powder; the coated fiber is then filament wound to create a "prepreg"; the prepreg is removed, cut, oriented, and laminated into a component shape; and the part undergoes binder pyrolysis and a subsequent firing cycle to densify the matrix. See J. J. Brennan and K. M. Prewo, "High Strength Silicon Carbide Fibre Reinforced Glass-Matrix Composites," *J. Mater. Sci.*, 15 463–68 (1980); D. C. Phillips, "Fiber Reinforced Ceramics," Chapter 7 in *Fabrication of Composites*, edited by A. Kelly and S. T. Mileiko, North-Holland Publishing Company, Amsterdam, The Netherlands, 1983; and K. M. Prewo and J. J. Brennan, "Silicon Carbide Yarn Reinforced Glass Matrix Composites," *J. Mater. Sci.*, 17 1201–06 (1982).

Other techniques for fabricating CFCCs also typically involve an infiltration process in order to incorporate matrix material within and around the fiber architecture, e.g. a fiber tow, a preformed fiber mat, a stack of a plurality of fiber mats, or other two dimensional (2D) or three dimensional (3D) preformed fiber architecture. These techniques include the infiltration of sol-gels. See J. J. Lannutti and D. E. Clark, "Long Fiber Reinforced Sol-Gel Derived Alumina Composites", pp. 375–81 in *Better Ceramics Through Chemistry*, Material Research Society Symposium Proceedings, Vol. 32, North-Holland, New York, 1984; E. Fitzer and R. Gadow, "Fiber Reinforced Composites Via the Sol-Gel Route", pp. 571–608 in Tailoring Multiphase and Composite Ceramics, Materials Science Research Symposium Proceedings, Vol. 20, edited by R. E. Tressler et al., Plenum Press, New York, 1986. Other techniques include polymeric precursors which are converted to the desired ceramic matrix material through a post-processing heat treatment. See J. Jamet, J. R. Spann, R. W. Rice, D. Lewis, and W. S. Coblenz, "Ceramic-Fiber Composite Processing via Polymer-Filler Matrices," *Ceram. Eng. Sci. Proc.*, 5 [7–8] 677–94 (1984); and K. Sato, T. Suzuki, Funayama, T. Isoda, "Preparation of Carbon Fiber Reinforced Composite by Impregnation with Perhydropolysilazane Followed by Pressureless Firing," *Ceram. Eng. Sci. Proc.*, 13 [9–10] 614–21 (1992).

Other research and development has involved molten metals that are later nitrided or oxidized. See M. S. Newkirk, A. W. Urquhart, H. R. Zwicker, and E. Breval, "Formation of Lanxide Ceramic Composite Materials," *J. Mater. Res.*, 1 81–89 (1986); and M. K. Aghajanian, M. A. Rocazella, J. T. Burke, and S. D. Keck, "The Fabrication of Metal Matrix Composites by a Pressureless Infiltration Technique," *J. Mater. Sci.*, 26 447–54 (1991). Other research and development has involved molten materials that are later carbided to form a ceramic matrix. See R. L. Mehan, W. B. Hillig, and C. R. Morelock, "Si/SiC Ceramic Composites: Properties and Applications," *Ceram. Eng. Sci. Proc.*, 1 405 (1980). Still other research and development has involved molten silicates that cool to form a glass or glass-ceramic matrix (see M. K. Brun, W. B. Hillig, and H. C. McGuigan, "High Temperature Mechanical Properties of a Continuous Fiber-Reinforced Composite Made by Melt Infiltration," *Ceram. Eng. Sci. Proc.*, 10 [7–8] 611–21 (1989)), and chemical vapors which decompose and condense to form the ceramic matrix (See A. J. Caputo and W. J. Lackey, "Fabrication of Fiber-Reinforced Ceramic Composites by Chemical Vapor Infiltration," *Ceram. Eng. Sci. Proc.*, 5 [7–8] 654–67 (1984); and A. J. Caputo, W. J. Lackey, and D. P. Stinton, "Development of a New, Faster, Process for the Fabrication of Ceramic Fiber-Reinforced Ceramic Composites by Chemical Vapor Infiltration," *Ceram. Eng. Sci. Proc.*, 6 [7–8] 694–706 (1985).

Two U.S. patents have issued which involve a method for the fabrication of a fiber reinforced composite by combining an inorganic reinforcing fiber with dispersions of powdered ceramic matrix in organic vehicles, such as thermoplastics. The first patent, U.S. Pat. No. 5,024,978, discloses a method for making an organic thermoplastic vehicle containing ceramic powder that can form the matrix of a fiber reinforced composite. This patent also discloses that the ceramic powder/thermoplastic mixtures can be heated to above the melt transition temperature of the thermoplastic and then applied as a heated melt to an inorganic fiber. This patent further discloses that the process may be used to make composite ceramic articles. The second patent, U.S. Pat. No. 5,250,243, discloses a method for applying a dispersion of ceramic powder in a wax-containing thermoplastic vehicle to an inorganic fiber reinforcement material to form a prepreg material such as a prepreg tow. This patent further discloses that the prepreg tow may be subjected to a binder pyrolysis step to partially remove the wax binder vehicle prior to consolidation of the prepreg tow into the preform of a composite ceramic article.

U.S. Pat. No. 5,936,861 discloses methods and apparatuses for making three-dimensional objects from continuous fiber reinforced composite materials. Slurry infiltration techniques are used to create a "prepreg" of reinforcement fiber and matrix material. The prepreg is formed into three-dimensional composite parts using a solid freeform fabrication process wherein the prepreg is extruded through a heated nozzle and deposited onto a base member and solidified.

To summarize, the continuous fiber reinforced ceramic composites ("CFCCs") prior to the present invention have traditionally been fabricated using methods and apparatuses to infiltrate the matrix or matrix-forming material around a preformed architecture of dense fibers or fiber tows or by passing the fibers through a powder/melt slurry. While these methods and apparatuses provide a fiber reinforced composite structure, there is no control over the thickness of the matrix forming vehicle, and rarely will the matrix uniformly surround the fibers. In such methods, the fibers often contact each other which is detrimental to the mechanical behavior of such composites. In addition, these infiltration processes are quite slow, sometimes requiring weeks or months to fabricate components, and are severely limited in the matrix/fiber combinations that can be produced.

Furthermore, currently available techniques for fabricating continuous fiber reinforced composite objects are not suited for mechanically forming fully dense objects having complex geometries from continuous fiber-reinforced filaments from ceramic powder raw materials.

Thus, there exists a need for more efficient methods and apparatuses for applying the matrix to the fiber reinforcement. There exists a further need for methods and apparatuses that are versatile enough to allow almost limitless combinations of matrix and fiber reinforcement. There also exists a need for efficient methods and apparatuses for rapidly making three-dimensional objects, particularly objects having more complex geometries, from CFCCs, and particularly directly from computer aided designs (CAD).

SUMMARY OF THE INVENTION

The present invention comprises novel continuous composite coextrusion methods and apparatus for fabricating fiber reinforced composite materials, particularly two- and three-dimensional objects having more complex geometries. Specifically, the present invention comprises novel methods and apparatus to fabricate composite materials via an economical, versatile, tow placement process that uses filaments or tapes produced by the controlled continuous composite coextrusion process. In a particular preferred embodiment of the present invention, multiple fiber tows (bundles of fibers) are introduced during melt extrusion of a ceramic (or metal)/binder feed-rod. The result of this coextrusion process is a coextruded "green" filament or tape containing an in-situ dense fiber or tow of fibers or multiple tows of fibers. The filament or tape is further processed or laid down using methods and apparatuses for rapid deposition of the green filament to provide two- and three-dimensional objects. Preferably, the objects are formed by an automated process directly utilizing CAD drawings of such parts.

More specifically, the present invention relates to processes for the rapid fabrication of a fiber reinforced composite, i.e., a composite which is comprised of a matrix of a material, such as a ceramic or metallic material, and having fibers of a ceramic material dispersed within the matrix as a reinforcement with an interface to protect the fibers from degradation during fabrication and service. A preferred method of the present invention comprises: (a) forming a material-laden composition comprising a thermoplastic polymer and at least about 40 volume % of a ceramic or metallic particulate in a manner such that the composition has a substantially cylindrical geometry and thus can be used as a substantially cylindrical feed rod; (b) forming a hole down the symmetrical axis of the feed rod; (c) inserting the start of a continuous spool of ceramic fiber, metal fiber or carbon fiber through the hole in the feed rod; (d) extruding the feed rod and fiber reinforcement simultaneously to form a continuous filament consisting of a "green" matrix material completely surrounding a dense fiber reinforcement and said filament having an average diameter that is less than the average diameter of the feed rod; and (e) mechanically depositing the continuous filament into a desired architecture to provide a green fiber reinforced composite. The green matrix may be subsequently fired, i.e., heated, to provide a fiber reinforced composite with non-brittle failure characteristics.

The present invention also provides a process for the fabrication of a fiber reinforced composite having an interlayer, i.e., a composite that is comprised of a matrix of material, such as a ceramic or metallic material, having fibers of a ceramic material dispersed within the matrix as a reinforcement, and having an interlayer that is between the matrix and fiber reinforcement. This method is the same as that described in the preceding paragraph, but further comprises forming a feed rod that contains two dissimilar particulate-laden compositions wherein during the extrusion process the second particulate-laden composition forms a green interlayer between the fiber reinforcement and the green matrix in a continuous filament. This filament can be arranged as described in the previous paragraph and both the green interlayer and the green matrix may be subsequently fired to provide a fiber reinforced composite having substantially improved non-brittle failure characteristics compared to a fiber reinforced composite in the absence of an interlayer.

Additionally, the present invention also provides a process for the introduction of multiple interlayers coated onto the fiber tows. This method is the same as that described in the preceding paragraph, but also includes forming a fiber tow coated with preceramic or carbon precursors to form green interlayers during the extrusion process between the fiber reinforcement and the green matrix in a continuous filament. This filament can be arranged as previously described, and both the green interlayer and the green matrix may be subsequently fired to provide a fiber reinforced composite having substantially improved non-brittle failure characteristics compared to a fiber reinforced composite in the absence of an interlayer.

In a preferred method of the present invention, a co-axial filament is produced with a fiber tow surrounded by a "green" ceramic. In a further preferred embodiment of the present invention, the process has been demonstrated utilizing carbon fiber tows in a hafnium carbide ("HfC") matrix, a zirconium carbide ("ZrC") matrix, and a silicon carbide ("SiC") matrix. The resulting products can be used in extreme, high temperature environments. The fibers impart the necessary thermal shock resistance and toughness that HfC, SiC and ZrC lack as monolithic ceramics.

Further advantages of the present invention include the use of interlayers that can act to provide both non-brittle failure characteristics as well as oxidation protection during service. Multiple fiber tows and combinations of fiber types may be co-extruded to provide continuous, flat, wide green ceramic tapes.

Another aspect of the present invention is the introduction of nano particulates of SiC, ZrC and alumina as sintering aids to the matrix. This assists in the reduction of the consolidation temperatures and results in protection of the fibers during the consolidation stage.

The present invention further provides methods for the fabrication of continuous filaments used in preparing fiber-reinforced composites wherein the architecture of the filaments can be readily controlled.

Yet another aspect of the present invention is the ability to take the continuous filaments and form a shaped green-body, especially directly from CAD designs. Generally, the continuous filament is passed to an apparatus for rapid deposition to form a two- or three-dimensional object of a desired shape and having a desired texture created by the arrangement of the filaments, such as based on the CAD design and the desired fiber lay-ups. The continuous filament is mechanically deposited at a controlled rate onto a surface. The deposited material is heated and subjected to compression forces to facilitate consolidation and bonding of the tow and substrate. The automated tow placement process joins the fiber-reinforced filaments together, creating a sold, shaped green body. The process allows a wide range of body geometries to be formed, particularly more complex geometries, based on fiber orientations which can be determined from the desired mechanical properties of the final object such as specific loading conditions and by the CAD design.

The processing techniques of the invention readily allows for control of the fiber volume fraction and changes to the matrix composition. This technology is readily applicable to other matrix/fiber combinations and will significantly enhance manufacturing capability for low cost, high-performance and high temperature ceramic composites. Objects formed in accordance with the compositions and methods of the invention are suitable for use in high temperature and high performance applications, such as turbomachinery and propulsion applications, where enhanced ablation and oxidation resistance at temperatures up to at least about 3500° C., adequate load bearing capabilities, non-catastrophic failure modes, and the ability to withstand transient thermal shock.

The present invention also contemplates that the complete process of blending the matrix and interface materials, coating of the multiple interface materials on the fiber or tow of fibers, co-extrusion of the filament or tape and the rapid fabrication of the green composite part from the CAD design of the part can be integrated into a continuous process.

The processing techniques of the invention further allow the simulation of the fabrication of the 3-D object through a simulation program and analytical modeling of the component mechanical properties to evaluate the ability of the component to withstand the contemplated service conditions.

DETAILED DESCRIPTION OF THE PREFERRED EMBODIMENTS

The present invention is directed to rapid fabrication methods and apparatuses for making two- and three-dimensional objects from continuous fiber reinforced ceramic, metal or intermetallic composite materials. Generally, fiber reinforced filaments are prepared from ceramic powders and fiber tows. A fiber-reinforced feedrod is co-extruded with an interface or multiple interfaces and fiber tow or tows to provide a fiber reinforced "green" filament (single tow) or tape (two or more tows). The green filament or tape is fed through a deposition apparatus where heat and pressure are applied locally to the deposited filament to form a two- or three-dimensional object of a desired shape and fiber arrangement. The object can be formed with desired fiber orientations that can be determined from specific loading conditions and CAD design of the objects. The apparatus is particularly suited for making three-dimensional objects have more complex geometries than currently possible.

Figure 1:
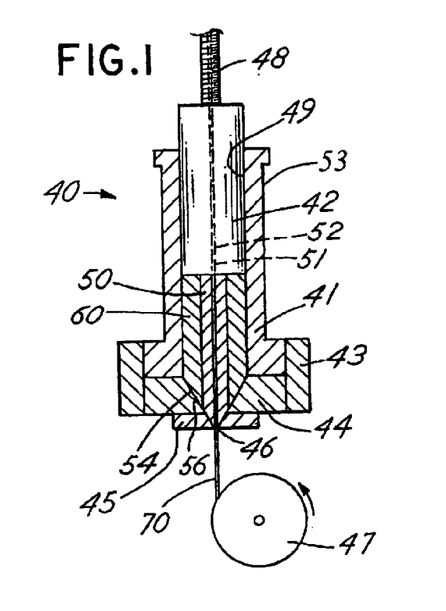
FIG. 1 illustrates a cross-section of a preferred apparatus of the present invention.

FIG. 1 illustrates a cross-section of a preferred apparatus for the co-extrusion of the matrix, interface and the fiber tow or tows of fibers in the present invention. The apparatus 40 is an extrusion die comprising an extrusion barrel 41, an extrusion ram 42, a cooling jacket 53, a heating jacket 43, a transition block 44, a spinnerette 45, an extrusion orifice 46, and a motor driven winding spool 47, a motor driven ram screw 48, and an inlet 49.

Figure 2:
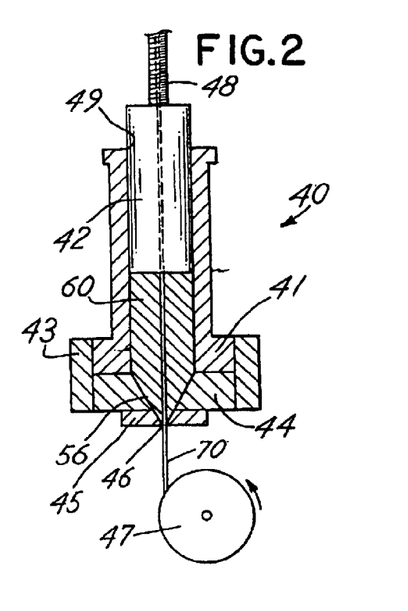
FIG. 2 illustrates a cross-section of another preferred apparatus of the present invention.
Figure 3A:
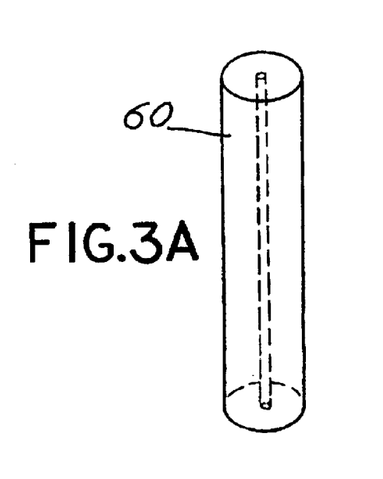
FIGS. 3A and 3B are schematic illustrations of the matrix feedrod without and with the interface material feedrod, respectively, in accordance with the present invention.
Figure 3B:
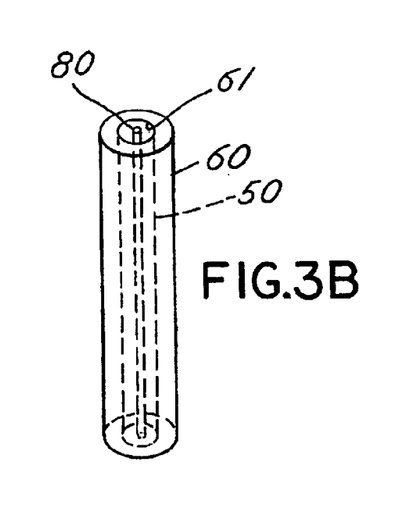
Figure 4:
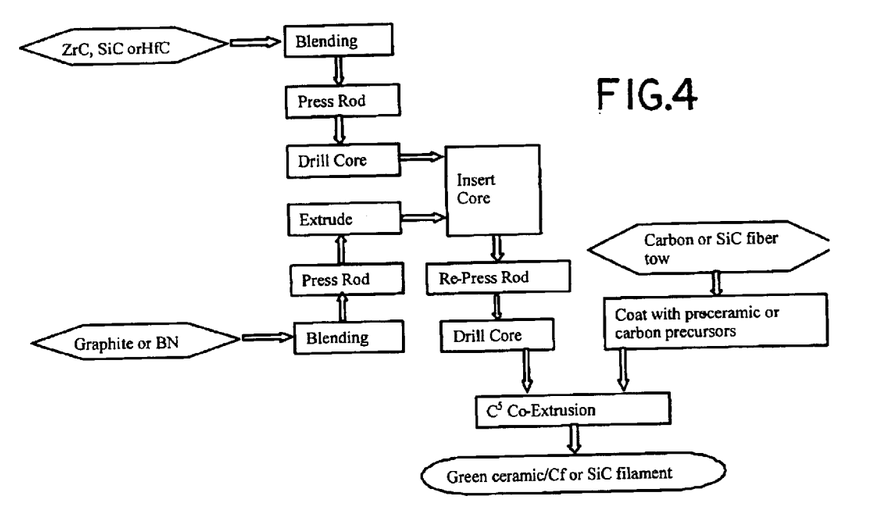
FIG. 4 is a flow chart illustrating a preferred method of the present invention.
Figure 5A:
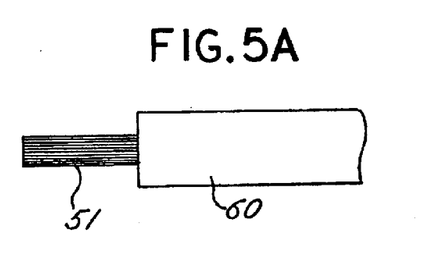
FIG. 5A is a schematic illustration of a "green" coaxial filament without an interface material and FIG. 5B is a schematic illustration of a "green" coaxial filament with an interface material layer in accordance with the present invention.

FIG. 4 depicts a flow chart of a preferred method of the present invention. In accordance with a preferred method and apparatus of the present invention, as shown in FIGS. 1–3, a matrix feedrod 60 is prepared. A single component matrix feedrod 60 (FIGS. 2, 3A and 5A) can be used. Preferably, one or more layers of interface material 50 are introduced between the fiber tow 51 and the matrix feedrod 60 (FIGS. 1, 3B and 5B) to limit the thermal expansion mismatch between the fiber and the matrix during a subsequent consolidation step and to otherwise limit damage to the filament during processing. The interface material enhances composite strength and toughness by deflecting cracks. A compound interface, such as where the fiber tow is coated with one or more other interface materials prior to being inserted into the rod 50, can be used to further enhance mechanical properties and to enhance the oxidation resistance of the composite at elevated temperatures. The compound interface could be either solid, liquid or in paste (sol-gel) form. A feedrod having two or more longitudinal, generally parallel fiber tows similarly can be prepared.

The matrix feedrod 60 can be prepared by blending a suitable matrix feedrod material, pressing the matrix feedrod material into a rod shape, and drilling a core hole 61 through the longitudinal axis of the matrix feedrod 60. The interface material rod 50 also can be prepared by blending material effective for limiting thermal expansion mismatch between the fiber and the matrix feedrod and pressing the material into a rod shape. The core hole 61 should have a diameter just large enough for the insertion of the interface material rod 50 there through. In a preferred embodiment, the matrix feedrod material comprises hafnium carbide ("HfC") or zirconium carbide ("ZrC") or silicon carbide ("SiC") and the interface material rod comprises graphite or boron nitride or silicon carbide. Preferably the ceramic powder/thermoplastic blend is pressed into a "green" rod having a diameter of about 0.885 inches, i.e., about 2.248 cm.

The blending steps for the matrix feedrod 60 and interface material rod 50 as shown in FIG. 1–3 can comprise milling, as necessary, and batching of matrix feedrod and interface material powders individually with thermoplastic binders and additives. In preparing the material-laden compounds used in the inventive methods, raw material powders are typically blended with an organic polymer and, advantageously, one or more processing aids.

The matrix feedrod is prepared using commercially available ceramic and metal powders using a process for converting ordinary ceramic powder into a "green" fiber that includes the powder, a thermoplastic polymer binder and, advantageously, other processing aids. Mechanically activated and agglomerate-free powders preferably are used. The powders, such as the metals, alloys, carbides, nitrides, oxynitrides, oxycarbides, borides, oxides, phosphates and suicides listed above, are selected to provide the desired mechanical properties in the final composite, and a wide variety of combinations of powders may be used. Powders having particle size distributions in the range of about 0.01 to about 100 microns ($\mu$m) in size may be used. Preferably, the particle size of the powder is between about 1 to about 10 microns.

A wide variety of powder ceramics may also be used in the material-laden compositions, affording a wide flexibility in the composition of the final fiber reinforced composite. Advantageously, powders that may be used in the first material-laden composition to provide the matrix feedrod include diamond, graphite, ceramic oxides, ceramic carbides, ceramic nitrides, ceramic borides, ceramic silicides, metals, and intermetallics. Preferred powders for use in that composition include aluminum oxides, barium oxides, beryllium oxides, calcium oxides, cobalt oxides, chromium oxides, dysprosium oxides, neodymium iron borides, iron cobalt, and other rare earth oxides, hafnium oxides, lanthanum oxides, magnesium oxides, manganese oxides, niobium oxides, nickel oxides, tin oxides, aluminum phosphate, yttrium phosphate, lead oxides, lead titanate, lead zirconate, silicon oxides and silicates, thorium oxides, titanium oxides and titanates, uranium oxides, yttrium oxides, yttrium aluminate, zirconium oxides and their alloys; boron carbides, iron carbides, hafnium carbides, molybdenum carbides, silicon carbides, silicon oxycarbides, tantalum carbides, titanium carbides, uranium carbides, tungsten carbides, zirconium carbides; aluminum nitrides, aluminum oxynitrides, cubic boron nitrides, hexagonal boron nitrides, hafnium nitride, silicon nitrides, sialons, titanium nitrides, uranium nitrides, yttrium nitrides, zirconium nitrides; aluminum boride, hafnium boride, molybdenum boride, titanium boride, zirconium boride; molybdenum disilicide; lithium and other alkali metals and their alloys; magnesium and other alkali earth metals and their alloys; titanium, iron, nickel, chromium, cobalt, molybdenum, tungsten, hafnium, rhenium, rhodium, niobium, tantalum, iridium, platinum, zirconium, palladium and other transition metals and their alloys; cerium, ytterbium and other rare earth metals and their alloys; aluminum; carbon; lead; tin; and silicon.

Additionally, the matrix may be doped with oxidation-inhibiting additives such as sodium silicate or boric acid or boron precursor resins to enhance the oxidation resistance of the composite material. The matrix may also contain additives such as nano-particulates of SiC, ZrC, HfC, $Al_2O_3$, $Y_2O_3$, or $ZrO_2$ and the like, in order to lower the consolidation temperature of the composite system.

The interface material can include graphite, boron nitride, silicon carbide, boron carbide, silicon nitride, sodium silicate, and boric oxide, either fully dense or in porous form. Additionally, to enhance oxidation resistance of the matrix and fibers, sodium silicate powders can be blended with the interface material. Anhydrous sodium silicate powders such as SS 65 and SS-C 200 powders available from PQ Corporation, Valley Forge, Pa., can be used.

Milling stations such as commercially available from Boston Gear, Boston, Mass. may be used as needed to ball mill the ceramic powder to obtain the desired size distribution. The desired ceramic powder preferably is ball milled with ethanol. The ceramic/ethanol blend is ball milled with milling media such as silicon nitride ($Si_3N_4$) or zirconium oxide ($ZrO_2$) thus creating a ball-mill slurry. Sintering aids such as, for example, aluminum oxide ($Al_2O_3$), silicon carbide (SiC) and yttrium oxide ($Y_2O_3$), when necessary, are added and milled together with the ball mill slurry. The powders are milled for a time effective for providing desired particle sizes and distribution. Typical milling times are between about 24 to about 120 hours, depending on the starting ceramic material. For example, boron nitride (BN) powder is milled for about 12 to 24 hours, silicon nitride powder is milled for about 24 hours, and zirconium carbide (ZrC), purchased as a fairly coarse refractory ceramic, is typically milled for a longer period, about 72 to 120 hours.

Upon completion of the milling operation, the ball mill slurry is collected from the milling station and the ceramic/ethanol mixture is separated from the milling media using a perforated mill jar lid as a "strainer". The ethanol is separated from the ceramic powder using a Buchi Rotavapor separator commercially available from Brinkman Instruments Inc. of Westbury, N.Y. Solvent is evaporated from the ball-milled slurry in the Buchi Rotavapor separator and the ceramic powder dried. Ethanol solvent may be reclaimed as desired for reuse or proper disposal according to local, state, and federal waste disposal requirements. The ceramic powders are removed from the separator jar and placed in labeled plastic jars.

The individual powders for the matrix and interface material are blended with thermoplastic melt-spinnable polymer binders, as well as one or more processing aids such as plasticizers as necessary, using a high shear mixer commercially available from C. W. Brabender of South Hackensack, N.J. or from Thermo Haake of Paramus, N.J., to form a smooth, uniformly suspended composite blend also referred to as a "dope". Examples of thermoplastic binders include polyethylene, ethylene ethylacetate (EEA) commercially available as DPDA-618NT from Union Carbide, ethylene vinylacetate (EVA) commercially available as ELVAX 470 from E.I. DuPont Co., and Acryloid Copolymer Resin (B-67) commercially available from Rohm and Haas, Philadelphia, Pa. Examples of plasticizers include heavy mineral oil (HMO) commercially available as Mineral Oil White, Heavy, Labguard® and methoxy polyethyleneglycol having a molecular weight of about 550 (MPEG-550) commercially available from Union Carbide. The composite blend is compounded at about 150° C. while metering a viscosity-modifying additive until a viscosity is obtained that will ensure desired rheology for a molten fiber extrusion process.

After preparation of the matrix feedrod 60 and the interface material rod 50, interface material rod 50 can then be inserted into and through core hole 61 of matrix feedrod 60. If desired, interface material rod 50 and surrounding matrix feedrod 60 can then be repressed to maintain their rod shapes. A cylindrical hole 80 can next be drilled through the longitudinal axis of interface material rod 50. In a preferred embodiment, cylindrical hole 80 has a diameter of about 0.125 inches, i.e., 0.318 cm.

Figure 5B:
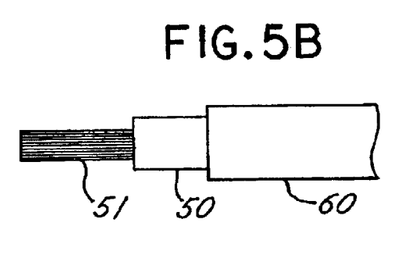

The interface layer 50 surrounding the fiber tow 51, as shown in FIG. 5B, has been found to reduce and eliminate matrix cracking in composites caused by the large CTE mismatch between the matrix feedrod and fiber materials. By pressing the graphite rods to different diameters, the interface material layer 50 can be varied as desired.

The resulting combination of interface material rod 50 and surrounding matrix feedrod 60 can then be inserted into inlet 49 and extrusion barrel 41, until it stops at location 54. If desired, a guide tube can be inserted through cylindrical hole 80 to facilitate feeding of the fiber tow through the hole.

Extrusion ram 42 can next be placed on top of the combination of interface material rod 50 and surrounding matrix feedrod 60. Extrusion ram 42 has a bore 52 having a diameter of sufficient size to receive the fiber tow 51 and slide over the guide tube 20, if such a guide tube is used. If more than a single fiber tow is used, the diameter of the holes in the extrusion ram 42 is modified accordingly. For example, if four (4) fiber tows are used, the extrusion ram 42 is modified to have four separate holes to accept each individual fiber tow.

Prior to insertion into the feedrod 60, the fiber tow 51 can be coated with one or more materials to enhance the mechanical and oxidation inhibition properties of the composite. To provide increased bonding between the fiber and the matrix, the fiber can be coated with a phenolic resin to provide a porous graphite coating after sintering. The phenolic coating can be used instead of the interface material layer, if desired. A catalyst, such as methyl-sulfonic acid catalyst, can be added to the phenolic resin to facilitate rapid polymerization of the phenolic resin. The fiber also can be coated with platinum to provide oxidation resistance and to reduce thermal expansion mismatch. Preferably, the fiber is coated with platinum prior to being coated with the phenolic resin. Additionally, the fiber can be coated with sodium silicate to provide a glassy interface that enhances oxidation resistance for the matrix and fiber. The individual fibers of the fiber tow can be separated and passed through a bath to coat the fibers. The coating can be rapidly cured with heating, and the fiber spooled before being passed to the extrusion apparatus 40. Additionally, the fiber tow or tows can be impregnated with a coating of a refractory ceramic precursor resin over the phenolic coating that will result in the formation of SiC, HfC, ZrC, $SiO_2$, $HfO_2$, or $ZrO_2$ after pyrolysis. The fiber tows can also be impregnated with a combination of ceramic precursor resin, boron precursor and sodium silicate resulting in a borosilicate glassy interface after pyrolysis. Additionally, an impregnated fiber tow, such as an epoxy impregnated fiber tow can be used to impart the desired characteristics to the final composite material.

Fiber tow 51 can then be inserted through bore 52 of extrusion ram 42 and cylindrical hole 80 of interface material rod 50, until the inserted end reaches extrusion orifice 46. The dimensions of the orifice are dependent on the co-axial filament or tape size desired.

As shown in FIGS. 1–2, heating jacket 43 heats the matrix feedrod 60 to melt the matrix feedrod material. Extrusion ram 42 pushes the matrix feedrod 60 through hearing jacket 43 to the soften zone 56. Preferably, soften zone 56 has a frusto-conical shape, with the outlet 46 located at the bottom of soften zone 56.

Co-axial filament or tape 70 is extruded from extrusion orifice 46 and wound on the motor driven spinnerette or winding spool 47. The cooling jacket 53 is used to lower the temperature along the extrusion barrel 41 away from the heating jacket 43, so that only the extrusion end of the barrel 41 is maintained at the extrusion temperature. Maintaining a lower temperature along the top end of the barrel 41 allows the introduction of the fiber tow as late as possible in the extrusion process to reduce binding failures and lessen the tension required to pull the fiber tow through the feedrod. Co-axial filament 70 thus comprises fiber tow 51, surrounded by interface material rod 50 and matrix feedrod 60. Co-axial filament 70 can also be called a green $ZrC/C_f$ filament, if ZrC is used as the matrix feedrod material, and the tow comprises a carbon fiber material.

Notably, the fiber tow 51 is centered in the green co-axial filament 70. If multiple tows used, they preferably are spaced equidistant from the edge of the co-axial filament. Design choices to achieve the desired product include varying the viscosities of ceramic powder/thermoplastic, interface material powder/thermoplastic blends or the ceramic precursor resin or sol-gel, and changing the composite fiber extrusion conditions. These choices can lead to a uniform interfacial coating.

A wide variety of fibers can be used in accordance with the present invention. The type of fiber to use is a design choice, as are types of fiber tows. For example, ceramic fibers can comprise silicon carbide or graphite/carbonmetal fibers can comprise tungsten, tantalum, steel, aluminum, and copper fibers, and magnetic fibers can comprise nickel, cobalt and tungsten wire. In choosing a fiber tow, factors to consider include fiber tow diameter, tow strength, tow elastic modulus, and the coefficient of thermal expansion (CTE). Three examples of carbon fibers that can be used in accordance with the present invention are as follows in Table 1.

TABLE 1

Carbon Fiber Tow Properties

| Supplier | Fiber Type | Tow Diameter (mm) | Tensile Strength Gpa (ksi) | Tensile Modulus Gpa (Msi) | Axial CTE ppm/K |
|---|---|---|---|---|---|
| Hexcel | AS4 3K | 0.387 | 5.93 (570) | 221 (32) | −0.7 |
| Hexcel | UHMS-G 3K | 0.242 | 3.48 (500) | 441 (64) | −0.5 |
| Amoco | T-300 3K | 0.393 | 3.65 (530) | 231 (33.5) | −0.6 |

The above fibers from Hexcel and Amoco are termed polyacrylonitrile ("PAN") type of fibers. Fibers from Amoco derived from a petroleum extract, referred to as "pitch" and commercially sold by Amoco with a prefix "P" could also be used. To improve fiber volume fraction, multiple fiber tows can be used. By way of example, four 3K-sized can be used to provide a 12K fiber tow in the filament after extrusion, and fiber volume fraction is about 25 to about 35%.

The starting fiber tow diameter is a factor in determining the fiber volume fraction of final composite parts. The tow strength and tow stiffness governs mechanical properties such as flexural and tensile strength in the final composite. The CTE of the fiber will determine the compatibility of the fiber/matrix and the size/type of interface. For example, the reported CTE value of the ZrC matrix is 6.9 ppm/K, while axial CTE of carbon fiber is less than 0 ppm/K. In order to minimize this CTE mismatch, a graphite interfacial coating is placed between the carbon fiber and ZrC matrix during co-extrusion.

After coextrusion, the fiber-reinforced filament can be passed through a bath of butyl oleate or the like to increase filament flexibility. For example, the filament 70 can be passed to a bath of heated butyl oleate subsequent to extrusion at the orifice 46. The filament 70 passes through and is immersed in the bath for a time sufficient to coat the filament before it is wound on the spool 47.

Although extrusion occurs generally as a batch process, it is possible to prepare a continuous filament having any desired length, as long as the end of the filament is not passed through the orifice 46 prior to extrusion of another feedrod. In this way, a continuous filament can be prepared and wound on the spool 47. The spooled filament can be held until it is subsequently formed into the desired object or can be passed directly apparatus for forming the object.

In other embodiments, the filament can be prepared by any modified continuous coextrusion process. As an example, the raw matrix and interface materials can be fed directly to an extrusion mechanism, along with the fiber tow, and extruded to form a continuous filament.

In other embodiments, the filament can be prepared from liquid precursor materials using any modified slurry infiltration process.

The prepared filament 70 is further processed using a method and apparatus for automated lay up of the filament to mechanically form a two- or three-dimensional object having a desired shape and filament architecture. The filament is deposited layer-by-layer in a predetermined arrangement to form the object. The filament can be deposited onto a flat surface, around a mandrel, or other suitable surface. Concurrent use of localized heat and pressure is utilized in forming the objects so that bonding is achieved between the newly deposited filament and the already-deposited composite material and also to consolidate the deposited composite material. The layer-wise formation is dependent on the fiber orientations which can be determined from specific loading conditions of the desired object and CAD design of the object.

Figure 6:
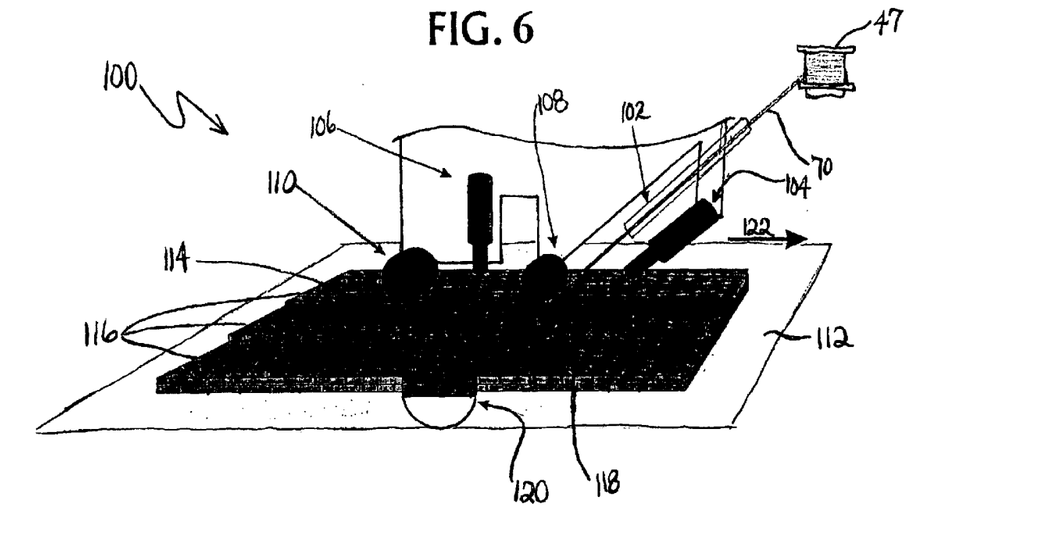
FIG. 6 is a schematic illustration of another preferred apparatus of the present invention illustrating its use as an automated tow placement process.

Referring now to FIG. 6, there is illustrated a preferred apparatus 100 for forming fiber reinforced composite materials. Generally, the apparatus 100 includes a filament feed assembly 102 through which the filament 70 is passed from the spool 47, one or more heat sources 104, 106, one or more compression mechanisms 108, 110, and a working surface 112. Preferably, the heat sources include a hot-gas nitrogen torch such as described in U.S. Pat. No. 5,626,471 which is incorporated by reference herein in its entirety. Preferably the compression mechanisms are rollers.

The filament 70 is directed by the feed assembly 102 and laid up onto the working surface 112 in layers 116. The heat sources 104, 106 are used to heat the filament as it is deposited on the working surface 112, as well as to heat the surface 114 of the laid up filament composite material. The first heat source 104 preheats the composite surface 114 adjacent the location where the filament is deposited, along with the incoming filament tow 70. The first roller 108 is positioned behind the point of filament deposition 118 in the direction of movement 122 of the apparatus and provides a compression force to the deposited filament and composite layers 116. The filament material 70 is thus "tacked" to the surface 114 by the first roller 108. This tacking procedure is useful in that the fed material is carefully bonded to the surface 114 and not pulled with the main consolidation roller 110. This tacking approach also aids in improving the efficiency of the cut and refeed mechanism (not shown). The second, main heat source 106 provides supplemental heating through substantially the thickness of the laid up material 116 to facilitate consolidation and bonding of the tow 70 and substrate 114 under the consolidation roller 110. The rollers 108, 110 are designed to provide the necessary forces to achieve intimate contact and bonding across the newly-formed tow interface for lamination and to achieve consolidation within the materials, as well as to provide boundary pressure to limit development of internal voids.

Overlap between adjacent layers is necessary so that no porosity exists in the final object. When pressure is applied during placement of the filament, the filament will be compressed and its dimensions will change. For example, a 1 mm high by 2 mm wide filament can be compressed to less than 1 mm by more than 2 mm. The extent to which the dimensions change is dependent on the temperature and pressure of the system.

The forces applied to both rollers 108, 110 are controlled independently using a series of pneumatic actuators. The composite tow layers 116 can be placed in a regular repeating pattern or with brick-face symmetry 120, as shown in the enlarged section of FIG. 10. The brick-face geometry has the advantage that more homogeneity is achieved throughout the composite structure. All the processing inputs are controlled either manually or through a PID control scheme from a LabVIEW™ interface.

The motion of the apparatus 110 and process parameters in forming the composite object preferably are computer-controlled. Preferably, a robotic work cell, such as an ABB IRB 6400 robotic work cell from Asea Brown Boveri (ABB) of Norwich, Conn. is used to control the motion of the apparatus. Green ceramic matrix laminates of any size (within limits of the robotic work cell), fiber orientation and material system can be fabricated in accordance with the methods of the invention.

Parameters including heat source temperature, height and gas flow rate, consolidation force and head velocity can be controlled as inputs to computer software. Additionally, final panel dimensions and lay-up sequences preferably based on CAD drawings of the desired object are inputs to the program. A computer-controlled nitrogen hot gas torch control system is used to monitor and control gas flow rate and temperatures within both heat sources 104, 106. The composite surface 114 temperatures can be adjusted by either increasing the process velocity or by independently adjusting the height of the heat sources. Temperature can be measured and controlled with an AGEMA Thermal Imaging camera with a neural network based PID control system. The camera measures the viewable peak temperatures on the laminate surface and adjusts the heat source heights accordingly to compensate for any deviation in set point temperatures. A Labview™ interface is used to input number of layers, ply orientation, surface temperatures, panel geometry, and process velocity. This interface can also be used in conjunction with a laser displacement unit to measure warpage during processing.

Typical process parameters for ceramic tow placement are listed in Table 2.

TABLE 2

Sample Process Parameters for Ceramic Tow Placement

| Process Parameter | Value |
| --- | --- |
| Initial thickness of tow | 1.0 mm |
| Width of tow | 2.0 mm |
| Radius of first roller | 15.8 mm |
| Radius of second roller | 19.0 mm |
| Second roller location | 80 mm from first roller |
| Gas Flow rate in torches | 50 liters/min |
| Location of first torch | 75 mm from nip point location |
| Location of main torch | 35 mm from nip point |
| Torch temperatures | 850° C. |
| Torch heights | 12 mm |
| Head velocity | 50 mm/s |
| Consolidation force | 190 N |

These process parameters can be adjusted according to the apparatus used and the properties of the composite materials. For example, the temperature of the first heat source can be adjusted from between about 850° C. to about 500° C., preferably about 500° C. In addition, in order to prevent the matrix from adhering to the rollers, the rollers require active cooling so that the roller temperature does not exceed the melt temperature of the binder. This is accomplished by positioning the main heater torch 106 to actively cool the second roller 110. For example, the gas flow rate for first heat source 104 is about 50 liters/min. and for the main heat source 106 is about 25 liters/min. Additionally, the first heat source 104 and/or first roller 118 can be disabled if the properties of the filament are such that the filament is too soft at the temperature of deposition so that the pressure applied by the first roller 118 would cause the matrix material to be squeezed out under the roller. The main heat source 106 can be positioned above the second roller 110 to actively cool it and maintain its temperature below the glass transition temperature of the filament material to prevent the matrix of the tows from adhering to the roller 110 and creating bare fiber spots and inconsistent quality.

The composite object can then be placed into a furnace and subjected to heat to burn out any remaining thermoplastic binder. Further, the composite object can be consolidated using any suitable method, including but not limited to, hot pressing, hot isostatic pressing, pressureless sintering, and self propagating high temperature synthesis, all of which are known to those skilled in the art. The consolidation step forms a fully dense fiber reinforced composite material. The resulting product of these steps is a fiber reinforced composite object.

The continuous composite coextrusion process of the present invention can be used for ceramic matrix composites ("CMCs") and metal matrix composites ("MMCs"). Further, the use of interlayers helps to control stresses due to mismatches among the coefficients of thermal expansion ("CTE"), including those set forth above. Further, the present invention reduces microcracking. In addition, the self-propagating, high temperature synthesis is versatile, although it requires an additional densification step.

The process of the present invention can be accomplished using various suitable materials, such as ceramic powders (having different particle sizes), thermoplastics, and plasticizers. The present invention can also incorporate various modifications to various steps, including the steps of compounding, making feed rods, passing the fiber/fiber tow through the feed rod, and using spinnerettes for extrusion. Further, the present invention can be used to achieve more than one fiber tow and/or more than one coating on a fiber/fiber tow (interlayers), and that the coated fibers/fiber tows of the present invention can be used to form various fiber reinforced ceramic objects.

EXAMPLES

The following examples further illustrate preferred embodiments of the present invention but are not be construed as in any way limiting the scope of the present invention as set forth in the appended claims.

Example 1

Hafnium Carbide Matrix/No Interface/Carbon Fiber Reinforcement

VPCA-BR00
Description: Core Material
Brabender Size: small
Batch Size: 42 cc
Batch Temperature: 150° C.
Batch Speed: 60 rpm
Ingredients:

TABLE 3

| Material | Density (g/cc) | Volume % | Volume (cc) | Weight (g) |
|---|---|---|---|---|
| HfC | 12.67 | 54.0% | 22.66 | 287.36 |
| EEA | 0.93 | 32.4% | 13.608 | 12.66 |
| B-67 | 0.94 | 3.6% | 1.512 | 1.42 |
| HMO | 0.881 | 10.0% | 4.2 | 3.70 |

In the above-cited formulation of Table 3, HfC is hafnium carbide powder from Cerac, Inc., designated as H-1004, B-67 is acryloid resin from Rohm and Haas, EEA is ethylene-ethyl acetate copolymers, and HMO is heavy mineral oil which is a plasticizer. A "Brabender" mixing machine (from C. W. Brabender of South Hackensack, N.J.) was used to mix the above-cited materials. The mixture of materials can then be formed into a feed rod with a hole through the symmetrical axis of the feed rod. After mixing, the mixture was formed into a feed rod-like shape like that shown in FIG. 1 and in detail in FIG. 3B. The carbon fiber reinforcement can be inserted into the hole of the matrix as desired. Following coextrusion, the result is a "green" material that still contains binder, like that shown in FIG. 5. This green material can now be formed in a desired manner, such as a billet. The billet can then be subjected to lamination in a warm pressing operation to fill remaining voids, and the result is a green billet. The green billet can then be subjected to pyrolysis and then the resulting part can be hot pressed, hot isostatic pressed, or pressureless sintered to densify the matrix.

Example 2

Hafnium Carbide Matrix/Graphite Interface/Carbon Fiber Reinforcement

The hafnium carbide matrix made in accordance with Example 1 is the same matrix for Example 2. The only difference in Example 2 is that the hole through the symmetrical axis of the feed rod is made larger so that a graphite interface can be inserted through the hole of the feed rod. The graphite interface defines a hole through its symmetrical axis, and the carbon fiber reinforcement can be inserted into the hole of the graphite interface, resulting in the product illustrated in FIG. 3B. Following coextrusion, desired formation (such as a billet), lamination, pyrolysis, and firing as described in Example 1 and 2 the result is a fully dense composite formation. The formulation for the graphite interface is as follows.

VPCA-BR06
Description: Core Material
Brabender Size: small
Batch Size: 42 cc
Batch Temperature: 150° C.
Batch Speed: 60 rpm
Ingredients:

TABLE 4

| Material | Density (g/cc) | Volume % | Volume (cc) | Weight (g) |
|---|---|---|---|---|
| Graphite-4929 | 2.25 | 49.0% | 113.19 | 254.68 |
| EEA | 0.93 | 49.0% | 113.19 | 105.27 |
| MPEG-550 | 1.104 | 2.0% | 4.62 | 5.10 |

In the above formation of Table 4, MPEG-550 is methoxy polyethylene glycol 550 (i.e., having an average molecular weight of 550). As previously noted, graphite interface has a hole through its symmetrical axis so that the carbon fiber reinforcement can be inserted through that axis as desired.

Various grades of materials can be used in accordance with the present invention, including various grades of HfC and graphite.

Example 3

The present invention can be used to make other reinforcements, including but not limited to:
Zirconium Carbide Matrix/Graphite Interface/Carbon Fiber Reinforcement;
Zirconium Carbide Matrix/No Interface/Carbon Fiber Reinforcement or Silicon Carbide Reinforcement;
Silicon Carbide Matrix/No Interface/Carbon Fiber Reinforcement;
Hafnium Diboride Matrix/Graphite Interface/Carbon Fiber Reinforcement;
Silicon Carbide Matrix/Boron Nitride Interface/Silicon Carbide Reinforcement;
Silicon Nitride Matrix/Boron Nitride Interface/Silicon Carbide Reinforcement;
Silicon Carbide Matrix/Boron Nitride-Sodium Silicate Interface/Carbon Fiber Reinforcement;
Silicon Carbide Matrix/Carbon-Silicon Carbide Interface doped with boron/Carbon Fiber Reinforcement;
Silicon Carbide Matrix/Carbon-Silicon Carbide-Sodium Silicate Interface doped with boron/Silicon Carbide Fiber Reinforcement;

Silicon Carbide Matrix/Boron Nitride-Sodium Silicate Interface/Silicon Carbide Fiber Reinforcement;

Silicon Carbide Matrix/Carbon-Silicon Carbide Interface doped with boron/Silicon Carbide Fiber Reinforcement; and Silicon Carbide Matrix/Carbon-Silicon Carbide-Sodium Silicate Interface doped with boron/Silicon Carbide Fiber Reinforcement.

The continuous composite coextrusion process of the present invention can be used to make a wide range of products having varying solids volume percentages and varying fiber diameters, such as the following hafnium carbide matrix ("HfC") and $C_f$ ("carbon fiber reinforcement") products:

1. HfC/$C_f$(25 vol. %), 18 μm carbon black interlayer
2. HfC/$C_f$(25 vol. %), 32 μm carbon black interlayer.
3. HfC/$C_f$(12.5 vol. %), 45 μm carbon black interlayer.

Thermal Expansion Considerations

| Material | CTE ($\times 10^{-6}$ K$^{-1}$) |
|---|---|
| $C_f$ | -0.1 (axial) |
| HfC | 7.2–8.2* |
| TaC | 7.3 |
| HfB$_2$ | 7.9 |
| ZrB$_2$ | 8.2 |
| SiC | 5.8 |

*Coors Analytical Laboratory

Example 4

ZrC may be pressureless sintered using sintering additives, for example, zirconium metal. The following examples show the density and flexural strength of composites wherein the consolidation was accomplished by pressureless sintering.

NCE-BR01

Description: Core Material
Brabender Size: small
Batch Size: 42 cc
Batch Temperature: 150° C.
Batch Speed: 60 rpm
Ingredients:

TABLE 5

| Material | Density (g/cc) | Volume % | Volume (cc) | Weight (g) |
|---|---|---|---|---|
| ZrC (10% SiC) | 6.35 | 53.65% | 22.53 | 143.08 |
| EEA | 0.93 | 30.00% | 12.60 | 11.72 |
| Wax | 0.92 | 3.75% | 1.58 | 1.45 |
| B-67 | 1.06 | 5.27% | 2.23 | 2.35 |
| Butyl Oleate | 0.87 | 7.33% | 3.09 | 2.69 |

NCE-BR02
Description: Graphite Interlayer Material
Brabender Size: small
Batch Size: 42 cc
Batch Temperature: 150° C.
Batch Speed: 60 rpm
Ingredients:

TABLE 6

| Material | Density (g/cc) | Volume % | Volume (cc) | Weight (g) |
|---|---|---|---|---|
| Graphite | 1.80 | 53.65% | 22.53 | 37.04 |
| EEA | 0.93 | 30.00% | 12.60 | 11.72 |
| Wax | 0.92 | 6.75% | 2.84 | 2.61 |
| B-67 | 1.06 | 5.27% | 2.23 | 2.35 |
| Butyl Oleate | 0.87 | 8.98% | 3.78 | 3.29 |

Thermal stresses and associated fractures were reduced in the production of relatively crack-free ZrC composites. Further reduction of thermal stresses and degradation of the carbon fibers was achieved during consolidation. This was accomplished by using Hexcel UHMS-G carbon fiber tow. It is believed that the higher elastic modulus of this fiber would help reduce the clamping forces on the fibers produced by the CTE mismatch and thereby eliminate microcracks. In addition, the fiber architecture was varied to better distribute the residual stresses. Two billets were prepared using ZrC (10 vol % SiC) powder.

Example 5

Feedrods were produced from the ZrC preliminary formulation consisting of 10 vol % nano-SiC as a sintering aid. Feedrods were also produced from BN powder. Blend formulations for the interface BN were developed using similar thermoplastic polymer binders as the ZrC to achieve consistent co-extrusion. Details of compounding recipes are given in Tables 7 and 8.

TABLE 7

| Type | ZrC with 10 vol % nano-SiC |
| Batch Size | 231 cc |
| Batching Temp. | 150 deg C. |
| Batching Speed | 60 rpm |

| Material | Density (g/cc) | Volume % | Volume (cc) | weight (g) |
|---|---|---|---|---|
| ZrC | 6.35 | 53.65 | 123.93 | 787.09 |
| EEA (MFI 20) | 0.93 | 30.00 | 69.30 | 64.45 |
| Luwax Al3 | 0.92 | 3.75 | 8.66 | 7.97 |
| B-67 | 1.06 | 5.27 | 12.17 | 12.90 |
| Butyloleate | 0.87 | 7.33 | 16.93 | 14.73 |
| Totals | 3.84 | 100.00 | 231.00 | 887.14 |

TABLE 8

| Type | BN Interface Material |
| Batch Size | 42 cc |
| Batching Temp. | 150 deg C. |
| Batching Speed | 60 rpm |

| Material | Density (g/cc) | Volume % | Volume (cc) | weight (g) |
|---|---|---|---|---|
| Boron Nitride | 2.250 | 49.00 | 20.58 | 46.31 |
| B-67 | 1.060 | 5.27 | 2.2134 | 2.35 |
| Al3 Wax | 0.920 | 6.75 | 2.835 | 2.61 |
| EEA (MFI 20) | 0.930 | 30.00 | 12.6 | 11.72 |
| Butyl Oleate | 0.873 | 8.98 | 3.7716 | 3.29 |
| | 1.578 | 100.00 | 42.00 | 66.27 |

The compounded material was pressed into rods (22.22 mm dia.×about 127.00 mm length) in a stainless steel die at 140° C. for 5 minutes. Composite feedrods were created then extruded with the phenolic-coated fibers into continuous "green" composite filaments. Extrusion of these rods was carried out at 140° C. and an extrusion rate of about 3.00 cc/min.

Example 6

Sintering aid additives that will yield samples having sufficient densities at lower consolidation pressure and temperature conditions were tested. The ZrC core material was blended with 10-vol % nano-SiC as a sintering aid. The need for lower consolidation temperatures is related to maintaining the post-consolidated integrity and mechanical properties of the reinforcing carbon fiber tows. If the final consolidation temperature of the composite is higher than the temperature to process the tows, fiber integrity will be destroyed during consolidation process. Therefore, it is important to determine effective sintering aids that will counteract the potential for low-density parts sintered under the necessary reduced pressure and temperature conditions.

Figure 7:
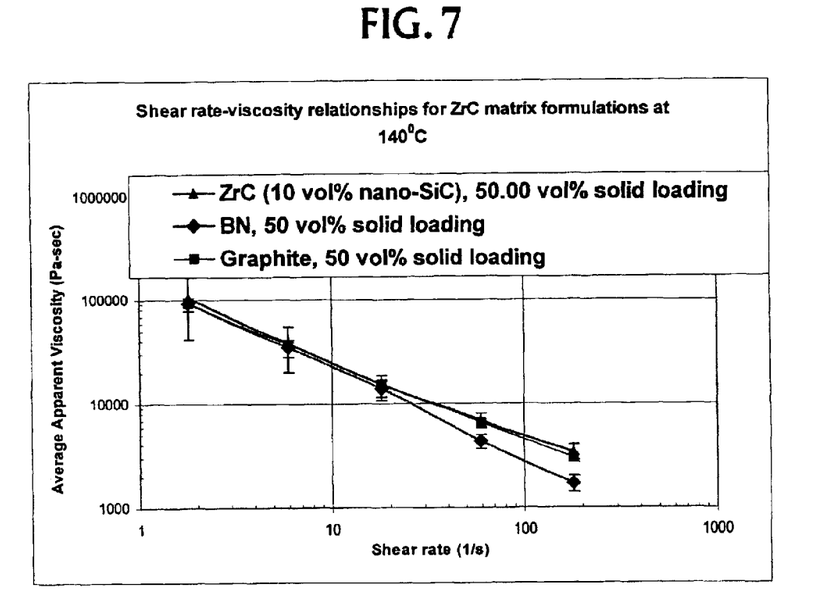
FIG. 7 is a graph illustrating viscosity and shear rate relationships for compositions in accordance with the present invention.

For consistent co-extrusion of the core and interface materials, the rheology of the ZrC should closely match the rheology of the BN interface material (the BN was formulated using the same binder system as the ZrC). The initial ZrC/binder system with 53.65 vol % solids loading showed inconsistent BN interfacial coating along the length of the extruded filament, possibly due to the higher viscosity created due to the nano-SiC addition. Therefore, the rheology of the ZrC core and BN interface formulations were evaluated using the Instron capillary rheometer. Rheology results on the ZrC blend showed the formulation was mismatched to the BN by nearly an order of magnitude. The vol % solids loading of the ZrC was then adjusted to 50-vol %, to match that of the BN formulation. Rheology results on the new ZrC formulation show a good match of the two blends (FIG. 7). Co-extrusion of the 50% ZrC and BN at 150° C. yielded filaments with a consistent BN interfacial layer thickness.

Example 7

Two green laminates were fabricated with ceramic tows: (1) 225 mm long×75 mm wide [0/0] (9" long×3" wide); and (2) 150 mm long×75 mm wide [0/90/0] (6" long×3" wide). For both cases, the process parameters are listed in Table 9. For both samples, the entire robot movement sequence was setup by computer programs.

TABLE 9

| Process Parameter | Value |
| --- | --- |
| Initial thickness of tow | 1.0 mm |
| Width of tow | 2.0 mm |
| Radius of first roller | Disabled |
| Radius of second roller | 19.0 mm |
| Second roller location | 80 mm from first roller |
| Gas Flow rate in first torch | 50 liters/min |
| Gas Flow rate in main torch | 25 liters/min |
| Location of first torch | 75 mm from nip point location |
| Location of main torch | Above second roller |
| First torch temperature | 500° C. |
| Main torch temperature | 25° C. |
| First torch height | Maximum (12 mm) |
| Head velocity | 50 mm/s |
| Consolidation force | Minimum (190 N) |

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention.

What is claimed is:

1. A method of making a composite three-dimensional object comprising:

(a) forming a continuous filament comprising a longitudinally extending continuous fiber and a material-laden composition comprising a thermoplastic polymer and at least about 40 volume % of a ceramic or metallic particulate, wherein the filament inclides a green matrix material from the material-laden composition, and wherein the green matrix material completely surrounds the fiber;

(b) passing the filament to a movable assembly for guiding placement of the filament onto an associated working surface;

(c) depositing the filament from the movable assembly without application of a compression force onto the working surface to form a lower filament layer having a predetermined filament orientation;

(d) depositing the filament from the movable assembly without application of a compression force onto the working surface to form an upper filament layer on top of the lower filament layer;

(e) heating the filament after it is deposited in the upper filament layer, a portion of the upper filament layer adjacent the deposited filament and a portion of the filament layer below and proximate to the deposited filament to a predetermined temperature effective for softening the green matrix material to provide a heated portion of deposited filament and filament layers;

(f) compressing the heated portion with a force effective for consolidating and bonding the green matrix material of the deposited filament and filament layers;

(g) solidifying the heated portion;

(h) repeating steps (d)–(g) one or more times as desired to provide a composite object comprising two or more filament layers and having a predetermined geometry.

2. The method of claim 1 further comprising preheating the filament as it is deposited onto the work surface to a temperature effective for adhering the filament to previously deposited filament 3. The method of claim 1 wherein the filament includes one or more interface layers between the matrix material and the fiber for enhancing non-brittle failure characteristics of the composite and oxidation protection.

4. The method of claim 3 wherein the one or more interface layer include materials selected from the group consisting of graphite, boron nitride, silicon carbide, boron carbide, silicon nitride and blends thereof.

5. The method of claim 1 wherein the filament includes a plurality of discrete fibers.

6. The method of claim 1 further comprising immersing the filament in a composition effective for increasing flexibility of the filament prior to depositing the filament onto the working surface.

7. The method of claim 1 further comprising:

(a) creating a drawing of the desired composite three-dimensional object utilizing a computer-aided design process, wherein the process generates a drawing including a plurality of segments; and (b) generating input signals based on the drawing for directing the movable assembly in the depositing the filament onto the working surface, wherein the movable assembly is guided in response to the signals.

8. The method of claim 1 further comprising blending a thermoplastic binder with the material-laden composition and beating the composite object to remove thermoplastic binder from the composite object and consolidating the composite object to provide a fully dense fiber reinforced composite object.

9. The method of claim 1, wherein the composite object is heated to a temperature and for a time effective for sintering the green material.

10. The method of claim 1, wherein the filament is cut after a length of filament has been deposited on the working surface.

11. The method of claim 1, wherein the compression force is applied using one or more rollers.

12. The method of claim 1, wherein the heated portion is compressed with a force of about 190 newtons.

13. A method of making a composite three-dimensional object comprising:
   (a) forming a feed rod having a longitudinal axis and having a hole extending down the longitudinal axis, the feed rod comprising a material-laden polymer composition comprising a thermoplastic polymer and at least about 40 volume % of a ceramic or metallic particulate;
   (b) inserting an end of one or more fibers through the hole in the feed rod;
   (c) extruding the feed rod and one or more fibers simultaneously to form a continuous filament that includes a green matrix material from the material-laden composition, the filament having an average diameter that is less than the average diameter of the feed rod and the green matrix material completely surrounding the fiber;
   (d) passing the filament to a movable assembly for guiding placement of the filament onto an associated working surface;
   (e) depositing the filament from the movable assembly without application of a compression force onto the working surface to form a lower filament layer having a predetermined filament orientation;
   (f) depositing the filament from the movable assembly without application of a compression force onto the working surface to form an upper filament layer on top of the lower filament layer;
   (g) heating the filament after it is deposited in the upper filament layer, a portion of the upper filament layer adjacent the deposited filament and a portion of the filament layer below and proximate to the deposited filament to a predetermined temperature effective for softening the green matrix material to provide a heated portion of deposited filament and filament layers;
   (h) compressing the heated portion with a force effective for consolidating and bonding the green matrix material of the deposited filament and filament layers;
   (i) solidifying the heated portion;
   (j) repeating steps (f)–(i) one or more times as desired to provide a composite object comprising two or more filament layers and having a predetermined geometry.

* * * * *